United States Patent
Ito et al.

(10) Patent No.: US 6,320,285 B1
(45) Date of Patent: Nov. 20, 2001

(54) THROTTLE VALVE CONTROL APPARATUS USING DC TORQUE MOTOR

(75) Inventors: Yoshiki Ito, Nagoya; Katsuhiro Asami, Chiryu, both of (JP)

(73) Assignee: Aisan Kogyo Kabushiki Kaisha (JP)

( * ) Notice: Subject to any disclaimer, the term of this patent is extended or adjusted under 35 U.S.C. 154(b) by 0 days.

(21) Appl. No.: 09/689,650

(22) Filed: Oct. 13, 2000

Related U.S. Application Data

(62) Division of application No. 09/307,795, filed on May 10, 1999, now Pat. No. 6,153,952.

(30) Foreign Application Priority Data

May 18, 1998 (JP) .................................................. 10-135631
Feb. 23, 1999 (JP) .................................................. 11-044514

(51) Int. Cl.$^7$ .................................................. H02K 33/00
(52) U.S. Cl. .................. 310/36; 310/254; 251/129.12
(58) Field of Search .................. 310/36, 156.01, 310/254; 123/399; 251/129.01, 129.12, 285

(56) References Cited

U.S. PATENT DOCUMENTS

| | | | | |
|---|---|---|---|---|
| 3,177,385 | * | 4/1965 | Montagu | 310/36 |
| 4,103,191 | * | 7/1978 | Kawamura et al. | 310/49 R |
| 4,145,725 | | 3/1979 | Wallis | 360/106 |
| 4,510,403 | | 4/1985 | Vanderlaan et al. | 310/36 |
| 4,528,533 | | 7/1985 | Montagu | 335/230 |
| 4,600,864 | | 7/1986 | Sato | 318/254 |
| 4,804,934 | | 2/1989 | Finke et al. | 335/229 |
| 4,845,424 | | 7/1989 | Gamble | 324/146 |
| 4,915,074 | * | 4/1990 | Safford Jr. | 123/399 |
| 5,016,588 | | 5/1991 | Padgin et al. | 123/399 |
| 5,038,064 | | 8/1991 | Florenza | 310/116 |
| 5,113,824 | * | 5/1992 | Haubner | 123/399 |
| 5,167,212 | * | 12/1992 | Peter et al. | 123/399 |
| 5,243,241 | | 9/1993 | Wang | 310/36 |
| 5,287,835 | * | 2/1994 | Fiorenza, II et al. | 123/352 |
| 5,334,893 | | 8/1994 | Oudet et al. | 310/38 |
| 5,624,100 | * | 4/1997 | Bolte et al. | 251/65 |
| 5,742,106 | | 4/1998 | Muraji | 310/36 |
| 5,753,985 | | 5/1998 | Redlich | 310/36 |
| 5,785,296 | * | 7/1998 | Peube et al. | 251/129.11 |
| 5,927,249 | | 7/1999 | Ackermann et al. | 123/399 |
| 5,996,554 | * | 12/1999 | Tojo et al. | 123/399 |
| 6,005,319 | * | 12/1999 | Kondo | 310/156 |
| 6,153,952 | * | 11/2000 | Ito et al. | 310/36 |

FOREIGN PATENT DOCUMENTS 6-6964  1/1994  (JP) .

* cited by examiner

*Primary Examiner*—Joseph Waks
(74) *Attorney, Agent, or Firm*—Finnegan, Henderson, Farabow, Garrett & Dunner, L.L.P.

(57) ABSTRACT

A throttle valve control apparatus includes a throttle valve, a DC torque motor for driving the throttle valve, the DC torque motor including a stator with coil wound therearound, and a needle including permanent magnets, the needle being rocked within a predetermined working angle range, wherein a magnetic path is formed within the stator, and a magnetic flux quantity is generated within the stator when current flows in the permanent magnets and the coil, wherein a magnetic flux is not saturated while the working angle of the needle is in a repulsion region where the needle repulses the stator and the magnetic flux is saturated while the working angle of the needle is in an attraction region where the needle is attracted to the stator, a throttle opening sensor for outputting information regarding an opening of the throttle valve, and a controller which controls the dc torque motor when receiving signals from the throttle opening sensor.

6 Claims, 11 Drawing Sheets

X–X SECTION
SECTION AREA A

THROTTLE VALVE CONTROL APPARATUS USING DC TORQUE MOTOR

This application is a division of application Ser. No. 09/307,795, filed on May 10, 1999, now U.S. Pat. No. 6,153,952.

BACKGROUND OF THE INVENTION

1. Field of the Invention

The present invention relates to a small-sized, light-weight DC torque motor which has good response characteristics and is simple to control, a drive control apparatus using the DC torque motor and a throttle valve control apparatus for an internal combustion engine.

2. Description of the Related Art

Conventionally, there has known a torque motor being rocked within a predetermined working angle range. For example, as shown in FIG. 11, Japanese Unexamined Patent Publication 6-6964 discloses a DC torque motor 100 consisting of a needle 101 rockable around axis 103 and a generally U-shaped stator 102 with a cavity disposed between them, wherein the needle 101 is composed of a soft iron core 104 and two permanent magnets 105, 106 fixedly attached to the periphery of the core 104, and the stator 102 has polarity portions 109, 110 facing to each other and coil 112 is wound around the proximal portion of the stator 102 (the upper part in FIG. 11).

In the above-specified DC torque motor and the like, torque is designed to be almost constant irrespectively of degree of angle within a predetermined angle range on condition that the current flowing in the coil is set constant. That is, the torque is designed to be flat to any angles within the predetermined angle range. For example, the above-mentioned publication discloses a DC torque motor capable of securing constant torque with constant flowing of current at almost entire ratable positions for the needle.

However, section area of the stator 102 (section area of magnetic path) needs to be large so as to achieve such characteristics. The stator 102 is affected by magnetic fields of the permanent magnets 105, 106 fixedly attached to the needle 101 and a magnetic field generated by current flowing in the coil 112. However, directions of the above-stated magnetic fields may sometimes coincide with each other, which depends on angle a of the needle 101. Under such a condition, since the stator 102 is made of soft magnetic material such as soft iron, once fluxoid quantum is saturated, the fluxoid quantum does not increase greatly even when current flows in the coil. As a result, torque becomes low in proportion to a variation of the fluxoid quantum. Therefore, section area of magnetic path needs to be made large to avoid saturation of the fluxoid quantum.

However, as the section area of magnetic path for the stator 102 is enlarged, dimensions, volume, weight of the stator 102 increase proportionally. Further, in case that a DC torque motor is controlled by angle of its shaft (rocking angle) α, large torque is required at the initial rocking so that the DC torque motor can be rocked within a large angle range to obtain high response characteristics. However, large torque is not required at the near-to-end rocking. Further, considerably high torque is not required for the DC torque motor to be rocked by a small angle.

SUMMARY OF THE INVENTION

The present invention has been made in light of the above problems. Therefore, an object of the present invention is to provide a small-sized, light-weight DC torque motor with good responsibility characteristics, a drive control apparatus using the same and a throttle valve control apparatus for use in, for example, an internal combustion engine.

To obtain the above-stated object, a moving magnet type DC torque motor rocked in a predetermined working angle range according to the present invention, is preferably characterized in that, while it is assumed that current, angle and torque satisfy the following relationship that: if current in positive direction is applied, the direction of angle at which the DC torque motor is rocked is positive and the direction of torque developed at this moment is positive; and if current in negative direction is applied, the direction of angle at which the DC torque motor is rocked is negative and the direction of torque developed at this moment is negative; wherein the motor has following angle-torque characteristics that positions of torque peaks among the torque in positive direction developed by the constant current in the positive direction spread in a low angle region among the working angle range, and positions of torque peaks among the torque in negative direction developed by the constant current in the negative direction spread in a high angle region among the working angle range.

The DC torque motor having the above-stated structure according to the present invention (to be simply referred to as 'motor' hereinafter) has the following angle-torque characteristics if the directions of the current, angle and torque are set as described above.

First, a case where the motor is rocked in (positive) direction in which angle increases is considered. In this case, if the motor is rocked greatly, that is, if the motor is rocked from a low angle $\theta1$ to a high angle $\theta2$ ($\theta1<<\theta2$) as in a case where the motor is rocked from the lower limit of the working angle range to the upper limit thereof, positions of torque peaks unevenly spread in the low angle region. Due to this, at a low angle, i.e., at the beginning of the motor operation, high torque can be obtained and the motor can be promptly accelerated. In addition, if angle increases, i.e., the motor is near to a stop position, the torque thus developed is lower. In other words, although the motor is rocked by high angle ($\theta2-\theta1$), the motor can be rocked to a desired angle $\theta2$ promptly and smoothly.

Meanwhile, if the motor is to be rocked to a less degree, an angular variation is small and response speed is not so influential. Accordingly, high torque is not required. Therefore, if the motor is to be rocked from a high angle $\theta3$ to a slightly higher angle $\theta4$ ($\theta3<\theta4$), torque peaks unevenly spread in the low angle region, which does not, however, adversely affect control operation.

Next, a case opposite to the above case, i.e., a case where the motor is to be rocked in (negative) direction at which angle decreases.

In this case, if the motor is rocked to a large degree, i.e., if the motor is rocked from a high angle $\theta5$ to a low angle $\theta6$ ($\theta5>>\theta6$) as in a case where the motor is rocked from the upper limit of the working angle range to the lower limit thereof, torque peaks unevenly spread in a high angle region. Due to this, at high angle $\theta$, that is, at the beginning of motor operation, high torque can be obtained and the motor can be, thereby, accelerated promptly. Also, if angle decreases, that is, if the motor is near the stop position, the torque thus developed is lower. In other words, although the motor is rocked by high angle ($\theta5-\theta6$), the motor can be rocked to a desired angle $\theta6$ promptly and smoothly.

Meanwhile, if the motor is to be rocked to a less degree, high torque is not required and an angular variation is small.

Accordingly, response speed is not so influential. Due to this, if the motor is to be rocked from a low angle θ7 to a slightly lower angle θ8 (θ7>θ8), positions of torque peaks unevenly spread in the high angle region, which does not, however, adversely affect control operation.

In other words, if angle is to be changed greatly, high torque sufficient to accelerate the motor can be developed and good response characteristics can be obtained. If angle is changed less greatly, torque developed may be low. The low torque does not, however, adversely affect control operation.

To obtain the above-stated object, in the inventive DC torque motor comprising a stator with coil wound therearound, and a needle including permanent magnets, the needle being rocked within a predetermined working angle range, it is preferable that magnetic path is formed within the stator, fluxoid quantum the permanent magnets and current flowing in the coil generate within the stator is not saturated while the working angle of the needle is in a repulsion region where the needle repulses the stator, and saturated while the working angle of the needle is in an attraction region where the needle is attracted to the stator.

Furthermore, in the DC torque motor according to the present invention, it is preferably that a magnetic flux quantity acquired by product of minimum section area of the stator and saturation magnetic flux density of the stator is smaller than a fluxoid quantum acquired by sum of maximum magnetic flux quantity the current flowing in the coil generates and maximum permanent fluxoid quantum the permanent magnets generate within the working angle range.

Still further, in the DC torque motor according to the present invention, it is preferable that the stator is composed of magnetic steel sheets superimposed, whose saturation magnetic flux density is larger than 1.6 T (tesla).

In the DC torque motor, torque T developed in the motor at a certain angle is proportional to a variation $\Delta\phi(=\phi-\phi0)$ of fluxoid quantum from $\phi0$ to $\phi$ by adding a magnetic field Hc generated within the stator by applying current to the coil to a magnetic field H0 generated within the stator by the magnets (T $\Delta\phi$). Also, in the DC torque motor, the working angle range is divided into a repulsion region in which torque is mainly developed by a repulsion force between the magnets and the magnetic poles in the stator, and an attraction region, opposite to the repulsion region, in which torque is mainly developed by an attraction force between the magnets and the magnetic poles in the stator. That is, the repulsion region herein means a rotating angle region of the needle where the needle including magnets is affected by repulsion force of the stator more greatly than attraction force thereof. On the other hand, the attraction region means a rotating angle region of the needle where the needle is affected by attraction force of the stator more greatly than repulsion force thereof.

Further, in the DC torque motor, if the motor is rocked (or rotated) in (positive) direction in which angle increases, the motor is operated such that a low angle region is in the repulsion region and a high angle region is in the attraction region. In other words, coil current is applied to obtain such directions. Conversely, if the motor is rocked in (negative) direction in which angle decreases, the motor is operated such that a high angle region is in the repulsion region and a low angle region is in the attraction region. In other words, if the motor is rocked by high angle such as rocked from one end of the working angle range to the other end thereof, the repulsion region is always employed at the beginning of rocking operation.

In the DC torque motor having the above-stated structure according to the present invention, the magnetic path of the stator has the section area as stated above. If the needle is in the repulsion region, the magnetic field H0 generated by the magnets is opposite in direction to the magnetic field Hc generated by the coil. In this state, magnetic flux quantity within the stator is on the decrease and is not saturated. As a result, the variation $\Delta\phi$ of the fluxoid quantum $\phi$ increases, so that high torque can be developed.

Meanwhile, if the needle is in the attraction region, the magnetic field H0 generated by the magnets is the same in direction as the magnetic field Hc generated by the coil. In this case, while the magnetic path of the stator has a small section area, even if the magnetic field Hc is added to the magnetic field H0, the magnetic flux quantity $\phi$ within the stator does not increase from that $\phi0$ caused by the magnets. This is because the magnetic flux quantity $\phi$ within the stator is saturated. As a result, even if the magnetic field H is increased by adding the magnetic field Hc to the field H, the magnetic flux quantity $\phi$ does not greatly increase and the variation $\Delta\phi$ of the magnetic flux quantity $\phi$ decreases, so that the resultant torque is low.

Accordingly, in the above-stated motor, if angle greatly varies such as, for example, from the repulsion region to the attraction region, the motor can be sufficiently accelerated with high torque and good response characteristics can be thereby obtained. On the other hand, if angle varies only within the attraction region, the resultant torque may be low. In this case, however, not so high torque is not required and the low torque does not adversely affect control operation. Besides, the stator has a magnetic path of a small section area enough to saturate fluxoid quantum in the attraction region, the stator of small dimensions, low volume and light weight may suffice, so that a small-sized, light-weight DC torque motor can be provided.

In these types of DC torque motors, it is preferable that the angle-torque characteristics in a case a low current is applied has a feature in that the characteristics is substantially constant in the working angle range irrespectively of the degree of angle. For instance, maximum coil current or a low current of about 20% of rated current is to be applied to the DC torque motor, it is considered that high torque is not inherently required. In these cases, only if the torque has almost constant characteristics irrespective of the degree of angle, adjustments, such as changing coefficients for feedback control in accordance with angle, need not be made or the adjustments can be easily made. Thereby, control algorithm is simplified and operation is therefore, simplified.

Furthermore, a drive control apparatus using a DC torque motor according to the present invention is preferably provided with the above-stated DC torque motor and conducts feedback control to the DC torque motor based on the above-stated angle.

The drive control apparatus having the above structure according to the present invention conducts feedback control based on the angle by using the DC torque motor having the above-stated angle-torque characteristics. Due to this, if the angle of the rocking shaft is to be changed greatly, the motor is accelerated with high torque, thereby allowing angular control with good response characteristics. Meanwhile, even if the angle of the rocking shaft is to be changed to a less degree, stable angular control can be realized without causing any problems. That is to say, stable control with good response characteristics can be realized.

The angular feedback control includes not only feedback control by directly measuring the angle of the rocking shaft but also indirect control of the angle by measuring physical quantity corresponding to the angle such as the opening of the valve and by using the resultant physical quantity. PD control and PID control based on the deviation of a present angle from a desired angle can be used as the feedback control method. Robust control, H control and other control methods may also be applied in consideration of the control accuracy and the like of the drive control apparatus.

The drive control apparatus includes, for example, a drive control apparatus for controlling the opening/closing of the throttle valve in an internal combustion engine. In addition, a valve drive control apparatus for controlling the opening/closing of various valves, a rocking shaft angle control apparatus in various machines and apparatuses and the like may be applied.

Moreover, to obtain the above-stated object, a throttle valve control apparatus according to the present invention preferably includes a throttle valve, a DC torque motor for opening/closing the throttle as stated forgoing, and a throttle opening sensor for outputting information on the opening of the throttle valve.

The throttle valve control apparatus having the above-stated structure according to the present invention opens/closes the throttle valve using the DC torque motor having the above-stated angle-torque characteristics and includes the throttle opening sensor Due to this, if the opening of the throttle valve is greatly changed (for example, from a fully closed state to a fully opened state), the rocking of the throttle valve can be accelerated with high torque at the beginning of the rocking operation and good response characteristics can be, thereby, obtained by conducting feedback control using the output of this throttle opening sensor. If the opening of the throttle valve is changed to a less degree, on the other hand, the torque developed may be low, which low torque does not, however, adversely affect control operation. Thus, it is possible to easily and stably control the throttle valve to have desired opening. Besides, the DC torque motor can be made small and light-weight and a small-sized, light-weight throttle valve control apparatus can be, therefore, obtained.

Any throttle opening sensors may suffice as long as they can detect opening. For instance, a sensor consisting of a potentiometer and a rotary encoder may be used.

Preferably, the above-stated throttle valve control apparatus further includes a back spring urging the throttle valve toward valve closing direction wherein holding coil current applied to the above-stated DC torque motor is substantially constant in the working angle range irrespectively of the degree of angle so as to obtain holding torque for holding the opening of the throttle valve while matching torque developed by the back spring torque.

For example, in the DC torque motor according to the present invention, holding current for holding the throttle valve at the present position is constantly at of about 1A irrespectively of working angle of the throttle valve when maximum current value of the DC torque motor is 5A.

Some throttle valve control apparatus includes a back spring for urging the throttle valve toward valve closing direction so as to automatically close the throttle valve when the motor malfunctions and the like. This back spring is set to have a small spring constant and, therefore, torque developed by the back spring is set not to increase greatly even if the opening of the valve increases. In the throttle valve control apparatus of this type, coil current (or holding coil current) for generating holding torque which matches the torque caused by urging the valve by the back spring, is applied to the motor.

In that case, if the holding coil current is substantially constant in the working angle range irrespectively of the degree of angle or substantially constant in a range from the fully closed state to the fully opened states of the throttle valve irrespectively of the opening of the throttle valve, adjustments, such as changing coefficients for feedback control in accordance with the opening are not required or can be easily made while feedback controlling the opening of the throttle valve. Thus, control algorithm is simplified and feedback control is thereby simplified.

DETAILED DESCRIPTION OF THE PREFERRED EMBODIMENTS

An embodiment of the present invention will be described in detail below with reference to the accompanying drawings.

First Embodiment

Figure 1A:
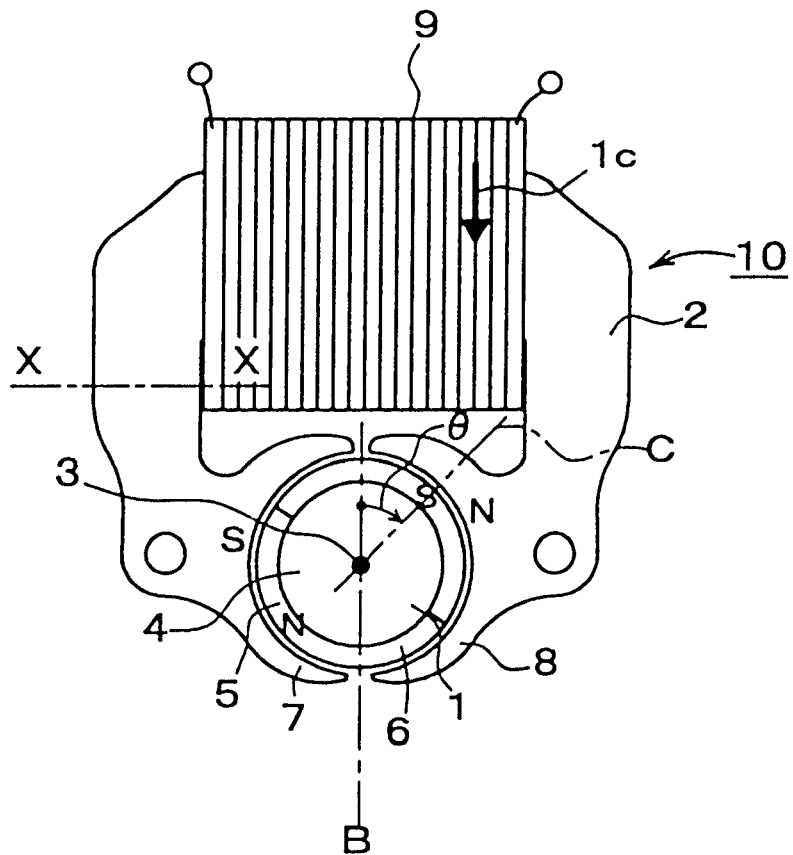
FIGS. 1(a) and 1(b) arc explanatory views showing configuration of a DC torque motor according to the First embodiment.
Figure 1B:
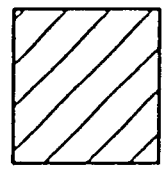

FIG. 1 is an explanatory view showing the configuration of a DC torque motor 10 according to the First embodiment. The DC torque motor 10 is a single-polar moving magnet type DC torque motor. Namely, the motor 10 is of a columnar shape about a shaft 3 and consists of a needle 1 and a generally U-shaped stator 2 made of soft iron keeping a predetermined cavity between the needle 1 and the stator 2, wherein the needle 1 includes hemicylindrical permanent magnets 5 and 6 fixedly attached thereto around a core 4 made of soft iron, first and second magnetic pole sections 7 and 8 are arranged on the end portions of the stator 2 facing to each other, and coil 9 is wound around the proximal portion of the stator 2 (the upper portion in FIG. 1). The stator 2 is composed of magnetic steel sheets superimposed, whose saturation magnetic flux density is larger than 1.6 T (tesla). FIG. 1(*b*) shows X—X section indicated in FIG. 1(*a*). Since magnetic steel sheets are superimposed, X—X section of the stator 2 is a rectangular shape. Section area of the X—X section is Acm$^2$.

The permanent magnets 5 and 6 fixedly attached to the core 4 are magnetized in opposite directions. That is, the magnet 5 has a front surface (outer peripheral surface) at N pole and a back surface (inner surface) at S pole, whereas the magnet 6 has a front surface (outer peripheral surface) at S pole and a back surface (inner surface) at N pole. The permanent magnets 5 and 6 and a coil current Ic flowing across the coil 9 generate magnetic poles at the first and second magnetic pole sections 7 and 8 of the stator 2. The needle 1 repulses from and attracts the resultant magnetic poles and is rocked around the shaft 3 by a predetermined range of angles. In the motor 10 according to this embodiment, the rocking angle θ of the needle 1 (shaft 3) is defined as an angle of line C connecting the boundary between the two magnets 5 and 6 and the shaft 3 with respect to a center line B passing the shaft 3 and between the first magnetic pole section 7 and the second magnetic pole section 8, the angle θ being a positive in an arrow direction in FIG. 1 (clockwise).

Although the motor 10 in this embodiment is, in theory, rockable in a range of θ=0 to 180 degrees, it is stable around θ=0 and 180 degrees at which the rocking direction is indeterminate and torque is extremely lowered. Considering this, the range of the rocking angle θ is limited to 90 degrees, i.e., θ=45 to 135 degrees in this embodiment.

Figure 11:
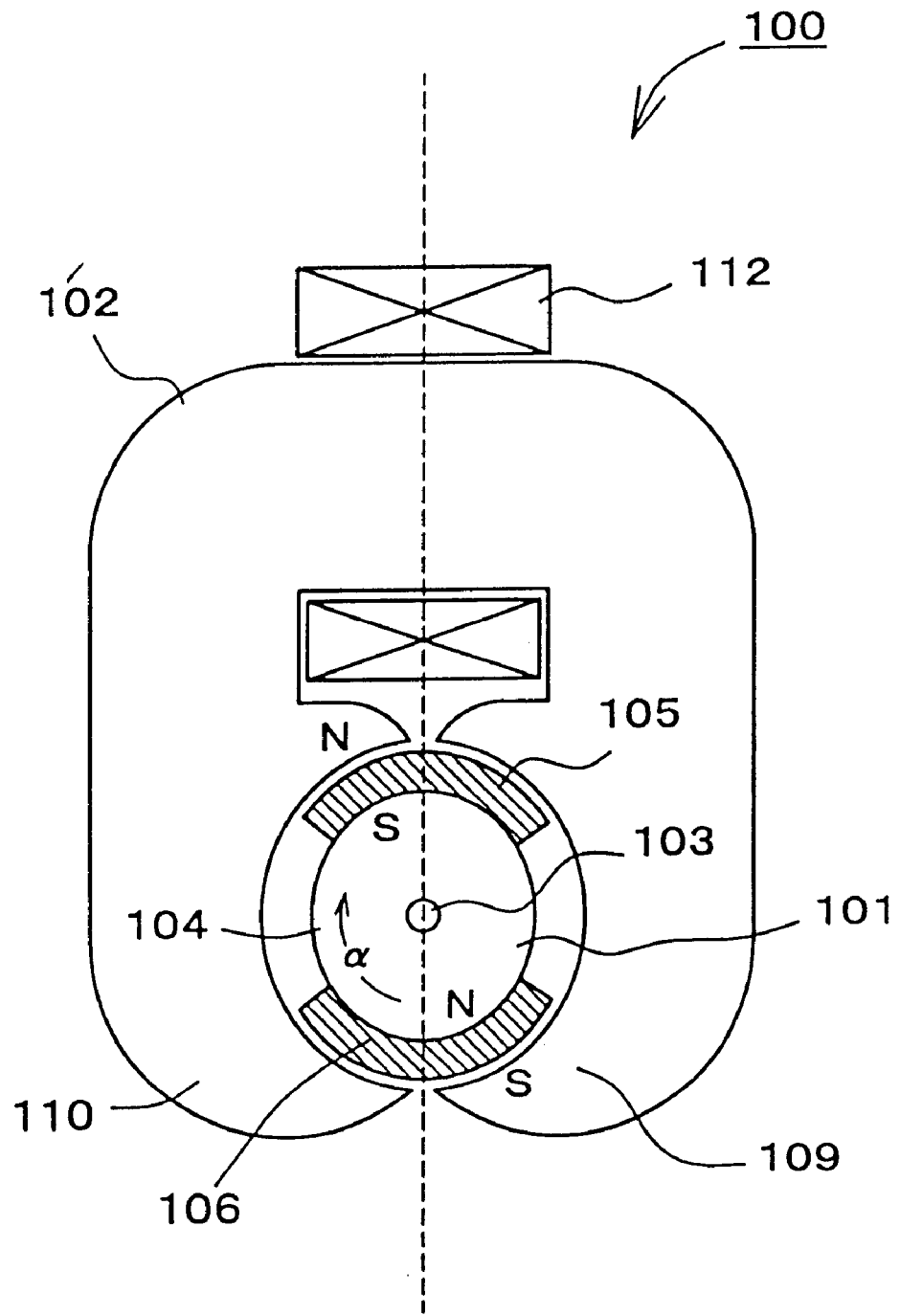
FIG. 11 is an explanatory view showing configuration of a conventional DC torque motor.

Unlike the above-stated conventional motor 100 (see FIG. 11) and a motor 110 (see FIG. 6(*a*)) according to Comparison Example to be described later, it is noted that arms of the stator 2 for the motor 10 is, formed to be slightly thinner than the two magnetic pole sections 7 and 8. As a result, using the stator 2 as a magnetic path circuit, magnetic flux quantity passing through the stator 2 is easily saturated in a part of the stator 2 having the smallest section area A (X—X section).

Figure 2:
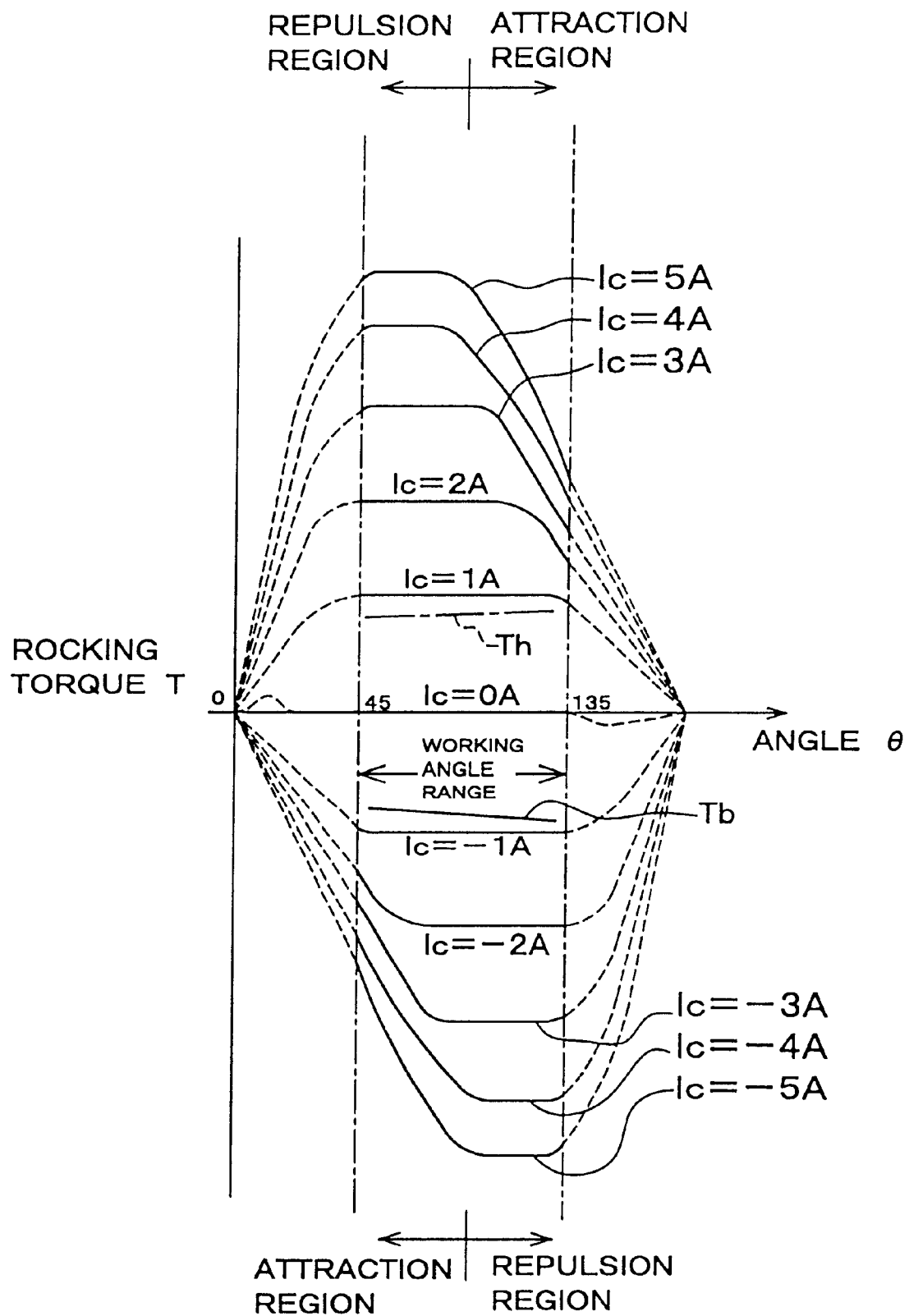
FIG 2 is a graph showing angle-torque characteristics of a DC torque motor according to the First embodiment.

Next, FIG. 2 shows the relationship between the angle θ of the motor 10 and torque T in this embodiment. In FIG. 2, the magnitude of the torque T energized when coil current Ic flows is indicated with the coil current Ic used as parameter while the needle 1 (shaft 3) is fixed at a certain angle θ. In this embodiment, the angle θ is taken in the horizontal axis, torque (rocking torque) T at a time when the motor is rocked in a direction in which the angle θ increases is assumed as positive torque and that at a time when the motor rocked in a direction in which the angle θ decreases is assumed as negative torque. Also, the direction of the coil current Ic for energizing the rocking torque T in the positive direction is assumed as positive direction, whereas the direction of the coil current Ic for energizing the rocking torque T in negative direction.

Therefore, the motor 10 in this embodiment develops rocking torque T in positive direction if positive coil current Ic is applied and rocking torque T in negative direction if negative coil current Ic is applied.

Now, taking note of the angle-torque characteristics of the motor 10 as shown in FIG. 2, it is seen from the respective graphs with respect to relatively high positive coil currents Ic=2A, 3A, 4A and 5A in the motor 10 having the highest currents Ic=±5A that the peaks (torque peak) of rocking torque T at those current Ic=2A, 3A, 4A and 5A are unevenly distributed in a low angle region of θ (e.g., if Ic=5A, the peak is in a range of about 50 to 80 degrees). From the respective graphs where relatively high (absolute values of) negative coil currents Ic=−2A, −3A, −4A and −5A, it is seen that the negative peaks (torque peak) of rocking torque T are unevenly distributed in a high angle range of θ (i.e., if Ic=−5A, the peak torque is in a range of about 95 to 130 degrees).

In case of relatively low coil currents Ic=1A and −1A, almost flat torque characteristics are shown in a working angle range of θ=45 to 135 degrees.

The above-mentioned angle-torque characteristics of the motor 10 are considered to be due to the following qualitative reasons. Note that no consideration is given herein to the residual magnetic flux quantity for the brevity of description.

Figure 3:
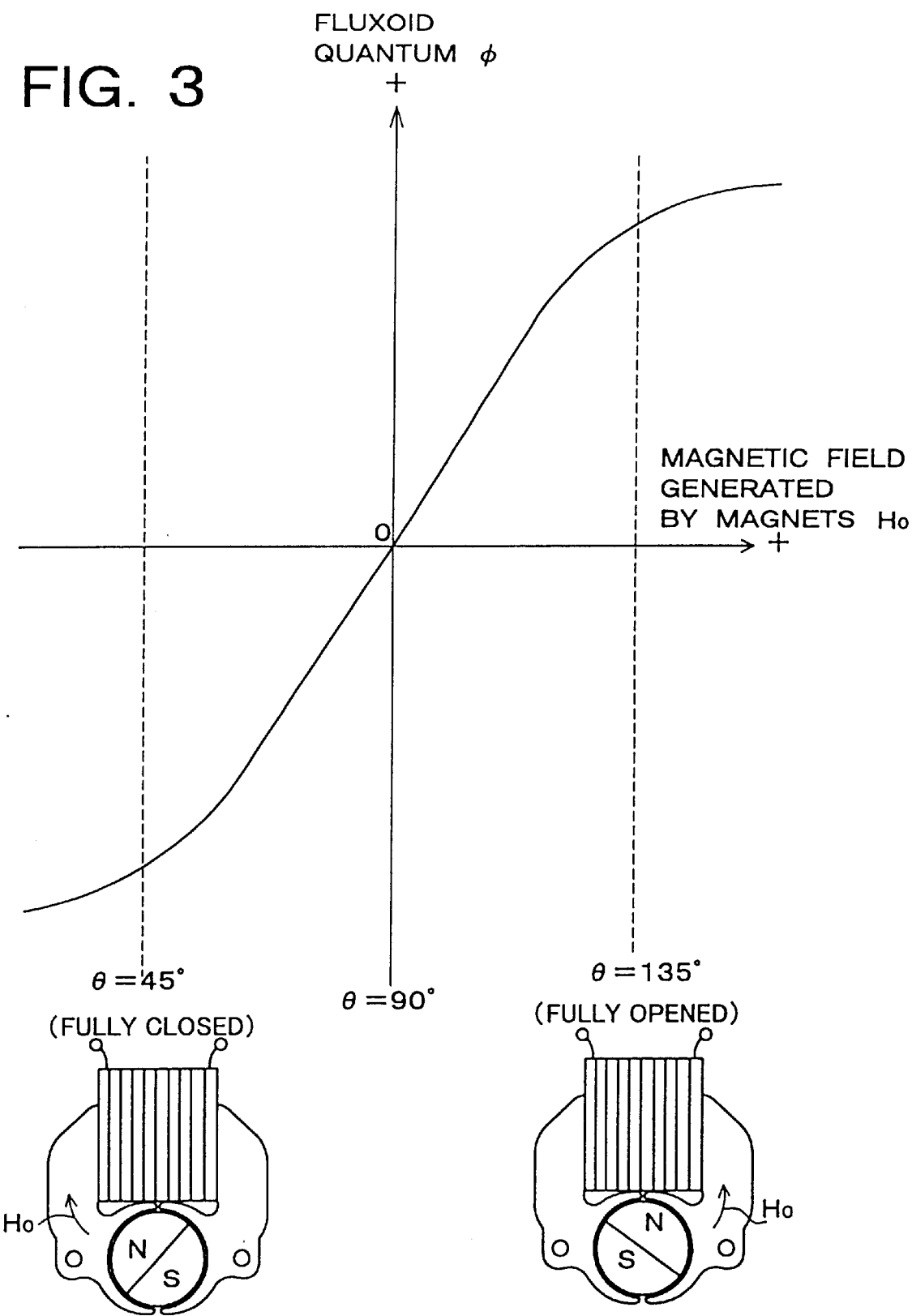
FIG. 3 is a graph showing relationship between magnetic field generated in a stator and fluxoid quantum obtained when current is not applied to coil, which is to explain the reason why such angle-torque characteristics occurs to a DC que motor according to the First embodiment.

First, in a state in which no coil current Ic is applied as shown in FIG. 3, the horizontal axis indicates a magnetic field H0 generated within the stator 2 by the magnets 5 and 6 and the vertical axis indicates fluxoid quantum φ in the stator 2. The strength of the magnetic field H0 corresponds to the position of the needle 1, i.e., to the angle θ and reaches a maximum at angles θ=0 and 180 degrees at which the polarities are opposite to each other. When θ=90 degrees, H0=0. While it is assumed that the magnetic fields generated within the stator 2 at angles θ=0 to 90 degrees are negative and the direction of the magnetic flux generated in the stator 2 is negative, whereas the magnetic fields generated within the stator 2 at angles θ=90 to 180 degrees are positive and the direction of the magnetic flux generated in the stator 2 is positive.

Then, since the stator 2 is made of soft magnetic material (soft iron), the relationship between the magnetic field H0 and magnetic flux quantity φ is represented as a curve as shown in FIG. 3. It is noted that the needle 1 of the motor 10 is in a state as shown in the lower part of FIG. 3 at angles 45 and 135 degrees corresponding to the magnetic fields indicated by broken lines. At this moment, within the stator 2, the magnetic field H0 in a direction indicated by solid lines occurs. In the motor 10 shown in the lower part of FIG. 3, the hemicylindrical magnets 5 and 6 of the needle 1 are schematic to clearly show the magnetic poles (N pole, S pole) seen on the surface of the needle 1. Thus, at the working angle of θ=45 to 135 degrees, the strength of the magnetic field H0 varies between the two broken lines.

Figure 4:
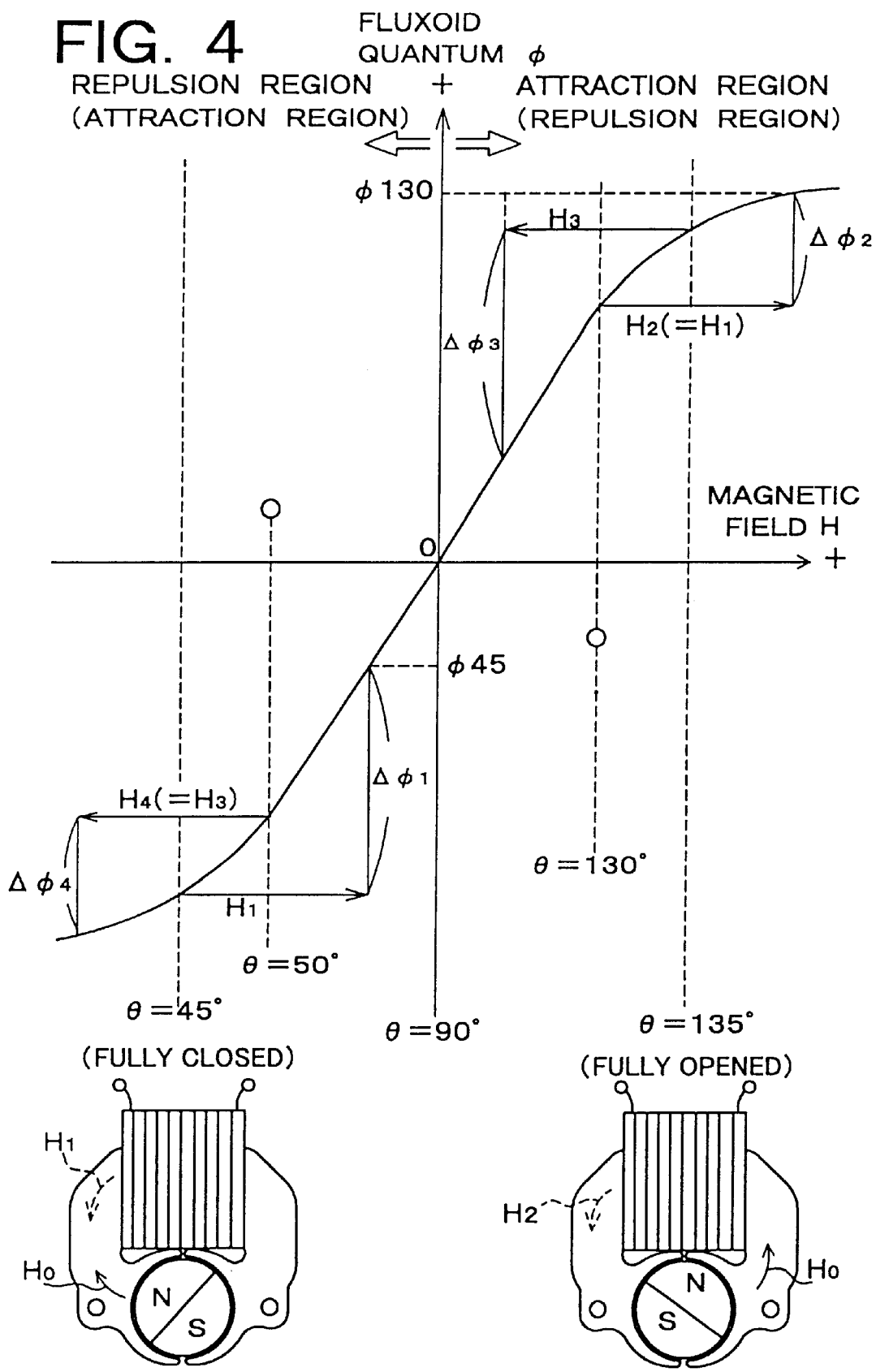
FIG. 4 is a graph showing relationship between magnetic field and fluxoid quantum generated in a stator on condition that current is applied to coil according to the graph of FIG. 3.

Now, a case where coil current Ic flows across the coil 9 is considered. In this case, a magnetic field is generated also by the coil current Ic. FIG. 4 is the same as the graph shown in FIG. 3, where the horizontal axis indicates the magnetic field H generated within the stator 2, i.e., the sum of the magnetic fields of the magnets 5, 6 and the coil 9. For instance, if the needle 1 is held at an angle θ=45 degrees as shown in the lower left of FIG. 4, so as to rock the motor 10 in a (positive) direction at which angle θ increases, it is necessary to apply a coil current Ic in the positive direction, and, as shown in the lower left part of FIG. 4, so as to generate a magnetic field H1 opposite in direction to the magnetic field H0 generated by the magnets 5 and 6 to thereby allow the magnetic pole sections of the stator 2 to repulse from the magnets 5 and 6. Due to this, the strength of the magnetic field H within the stator 2 is shifted by H1 in the right direction of FIG. 4. That is, the absolute value of the strength of the magnetic field H within the stator 2 is decreased. As a result, magnetic flux quantity φ within the stator 2 varies by Δφ1 (i.e., the absolute value of magnetic flux quantity φ is decreased). That is, in FIG. 4, φ45 indicates magnetic flux quantity decreased.

Meanwhile, as shown in the upper right portion of FIG. 4, if the motor 10 is rocked in a (positive) direction so that the angle θ increases, i.e., the angle θ is close to the broken line range of θ=135 degrees, a coil current Ic in the same (positive) direction as that when the magnetic field H1 is generated is applied and a magnetic field H2 in the same direction is generated. In this case, however, as shown in the lower right part of FIG. 4, the magnetic fields H0 generated by the magnets 5 and 6 and H2 are the same in direction and the magnets 5 and 6 and the magnetic pole sections 7 and 8 of the stator 2 attract one another. Due to this, the strength of the magnetic field H within the stator 2 is shifted by H2 in the right direction of FIG. 4. That is, the absolute value of the strength of the magnetic field H within the stator 2 increases. As a result, magnetic flux quantity φ within the stator 2 varies by Δφ2 (i.e., the absolute value of magnetic flux quantity φ increases). That is, in FIG. 4, φ130 indicates magnetic flux quantity increased.

It is noted that the variation Δφ2 of fluxoid quantum φ in this case is smaller than the variation Δφ1 as stated above (Δφ1>Δφ2).

Figure 5:
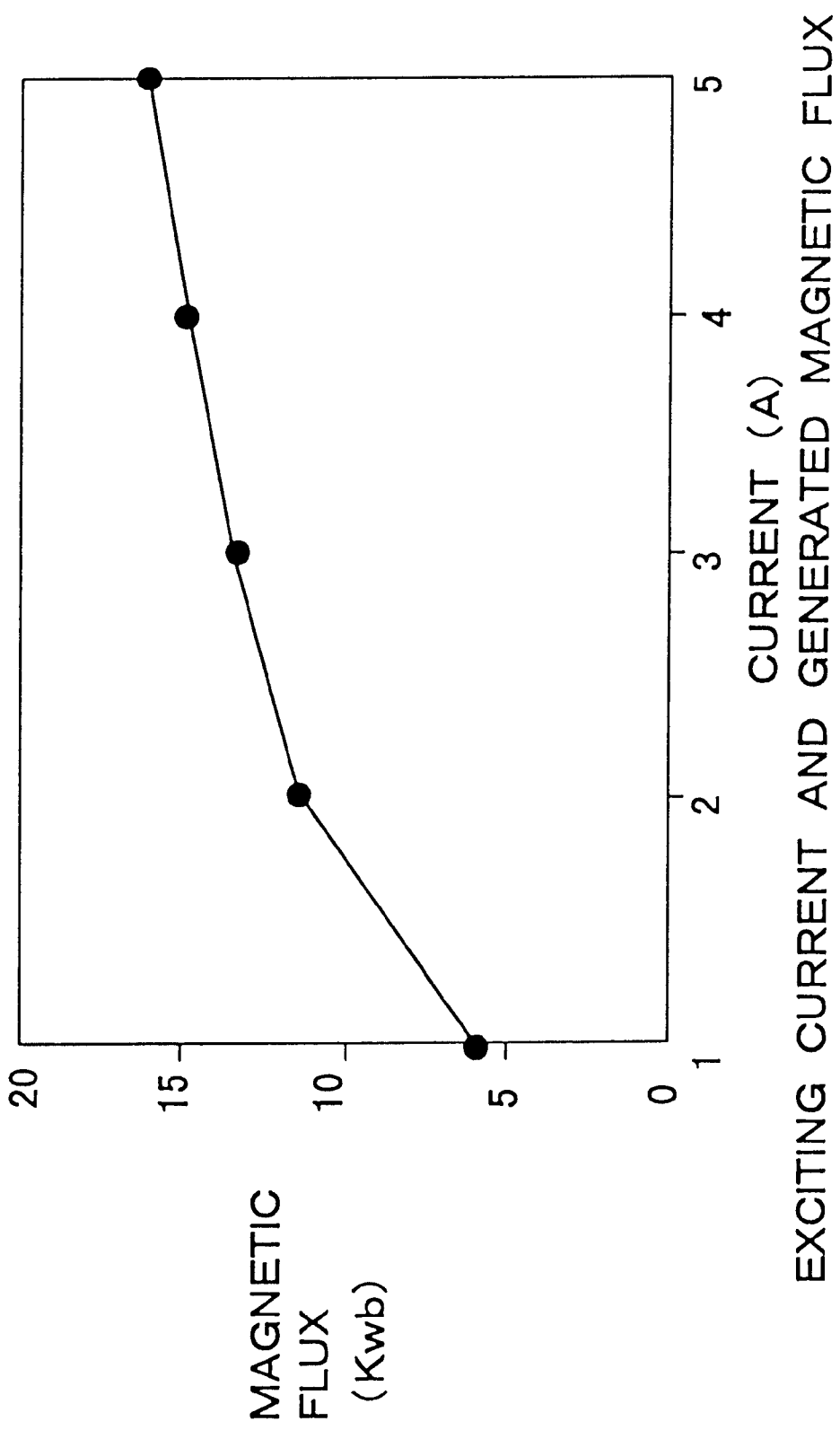
FIG. 5 is a graph showing relationship between exciting current and generated magnetic flux.

The FIG. 5 shows the relationship between exciting current for the coil and generated magnetic flux of the motor 10 according to this embodiment. The horizontal axis indicates exciting current and the maximum value is 5A. The vertical axis indicates magnetic flux. When exciting current is set to 5A, the maximum, magnetic flux is 16 KWb.

The maximum magnetic flux of the magnetic field H2 generated within the working angle range by the magnets 5 and 6 is 22 KWb and saturation magnetic flux density B for the stator 2 is 1.6 T (tesla). The section area A is determined to satisfy the condition that product of A and B, namely, B*A, is smaller than 38 KWb which is sum of 16 KWb generated by the maximum exciting current 5A and 22 KWb by the magnets 5 and 6 within the working angle range. In the motor 10 according to this embodiment, it is calculated that A=2.37 cm². Thereby, B*A=37.9 KWb is acquired and this value is slightly smaller than 38 KWb, the sum of magnetic flux by the maximum exciting current and magnetic flux by the magnets 5 and 6.

In the motor 10 in this embodiment, the section area A for the magnetic path of the stator 2 is not so increased. Due to this, even if the strength of the magnetic field H increases, the magnetic flux quantity φ generated is saturated and is thereby not so increased in the latter case. In the former case, by contrast, the absolute value of the strength of the magnetic field H decreases, so that the magnetic flux quantity φ decreases greatly.

The above description is related to a case where the motor 10 is rocked in a (positive) direction in which the angle θ increases. Even if the motor 10 is rocked in a (negative) direction in which the angle θ decreases and the magnetic fields H3 and H4 are generated by the coil 9, variations Δφ3 and Δφ4 in magnetic flux quantity φ satisfy the relationship of Δφ3>Δφ4 as in the case of the above.

As can be seen from the above description, if the motor 10 is rocked in positive direction, the magnetic field H0 generated by the magnets 5 and 6 is negative, i.e., in the left half of the graph in FIG. 4 or the angle θ is between 0 and 90 degrees, then the magnetic field H0 is in a repulsion region in which torque is developed by the repulsion force between the magnets 5 and 6 of the needle 1 and the magnetic pole sections 7 and 8 of the stator 2. If the magnetic field H0 generated by the magnets 5 and 6 is positive, i.e., the angle θ is between 90 and 180 degrees, then the magnetic field H0 is in an attraction region in which torque is developed by the attraction force between the magnets 5 and 6 of the needle 1 and the magnetic pole section 7 and 8 of the stator 2 (see FIG. 2).

Conversely, if the motor 10 is rocked in negative direction and the magnetic field H0 generated by the magnets is positive, i.e., the magnetic field H0 is in the right half side of the graph in FIG. 4 or the angle θ is between 90 and 180 degrees, then the magnetic field is in a repulsion region as indicated by a word in parenthesis. Also, if the magnetic field H0 by the magnets is negative, i.e., the angle θ is between 0 and 90 degrees, the magnetic field is in an attraction region as indicated by a word in parenthesis.

The rocking torque T energized in the DC torque motor is generally proportional to the variation Δφ of magnetic flux quantity φ (T Δφ). Therefore, as stated above, while Δφ1>Δφ2, even if the same coil current Ic is applied, high torque is obtained in a region in which the angle θ is low with the motor rocked in the positive direction and low torque is obtained in a region in which the angle θ is high. Likewise, while Δφ3>Δφ4, high torque is obtained in a region in which the angle θ is high and low torque is obtained in a region in which the angle θ is low if the motor is rocked in negative direction. They correspond to the feature of angle-torque characteristics of the motor 10 (see FIG. 2).

In case of employing the motor 10 having the above-stated characteristics (see FIG. 2), the following advantages can be obtained. It is assumed that the angle θ is changed greatly, e.g., the angle θ is changed from θa=45 degrees to θb=135 degrees. In this case, to provide good response characteristics, it is necessary to sufficiently accelerate the motor (or to apply high angular acceleration to the motor) at the beginning of rocking operation. As can be seen from the graph of FIG. 2, the motor 10, if rocked in positive direction, can be sufficiently accelerated since high torque is obtained in a region in which the angle θ is low, i.e., in a repulsion region. Meanwhile, the motor is easily stopped in a stop position in which the angle θb is close to 135 degrees, since the torque developed in the position is low. In other words, although the angle θ is changed by 90 degrees from θa=45 degrees to θb=135 degrees, the motor has good response characteristics and can be rocked smoothly.

Meanwhile, if the angle θ is changed to a less degree, an angular variation is small and, therefore, high angular acceleration need not be applied to the motor. Thus, in a case where the angle is changed from θc=125 degrees to θd=135 degrees and the motor is rocked in positive direction, the torque developed is low in a region in which the angle θ is high, i.e. in an attraction region but the motor can be controlled without difficulty, as can be seen from the graph of FIG. 2.

In addition, if the motor is rocked in negative direction and the angular variation is large as in the case of the above, then the motor has good response characteristic and can be rocked smoothly. If the angular variation is small, the motor can be easily controlled.

In the motor 10 in this embodiment, in particular, if coil currents are Ic=1A and −1A, the motor has a flat angle-torque characteristics that torque T is not changed regardless of the angle θ. The application of a low current to the motor originally means that high torque is not required. Therefore, peaks of torque need not unevenly exist as seen in a case where higher coil current Ic is applied. Rather, since the torque T is not changed by the angle θ, adjustments such as changing control coefficients in accordance with the angle are not required or such adjustments can be easily made if the motor 10 is driven by the angle-based feedback control. As a result, easier control can be realized, e.g., the algorithm for feedback control can be simplified.

Comparison Example

Figure 6A:
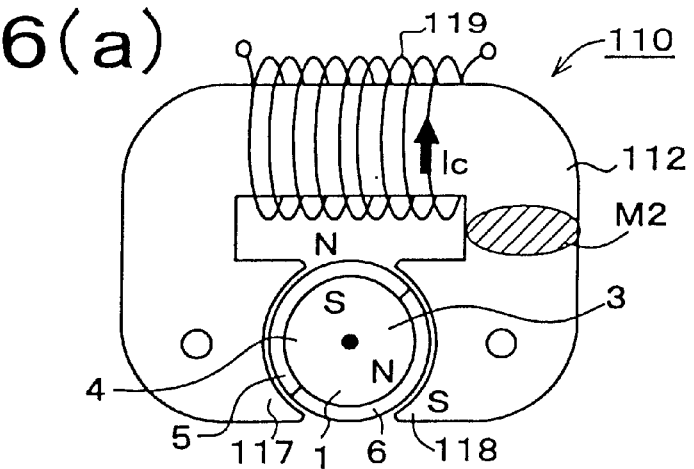
FIG. 6(a) shows a schematic view of a DC torque motor according to Comparison Example wherein section area of magnetic path in a stator is made larger than that of a motor according to the First Embodiment.

As a Comparison Example of the motor 10, FIG. 6(a) shows a motor 110 in which section area M2 of magnetic path for a stator 112 is made larger than that of the motor 10 according to the First Embodiment. In the motor 110, a needle 1 is identical to the one for the motor 10, however, section area M2 of the stator 112 is made larger than section area A of the stator 2 for the motor 10 (M2>A). That is, the stator 112 is made thicker (wider) than the stator 2 for the motor 10 and any portions of the stator 112 including magnetic pole sections 117 and 118 are made almost constant in terms of section area.

Figure 6B:
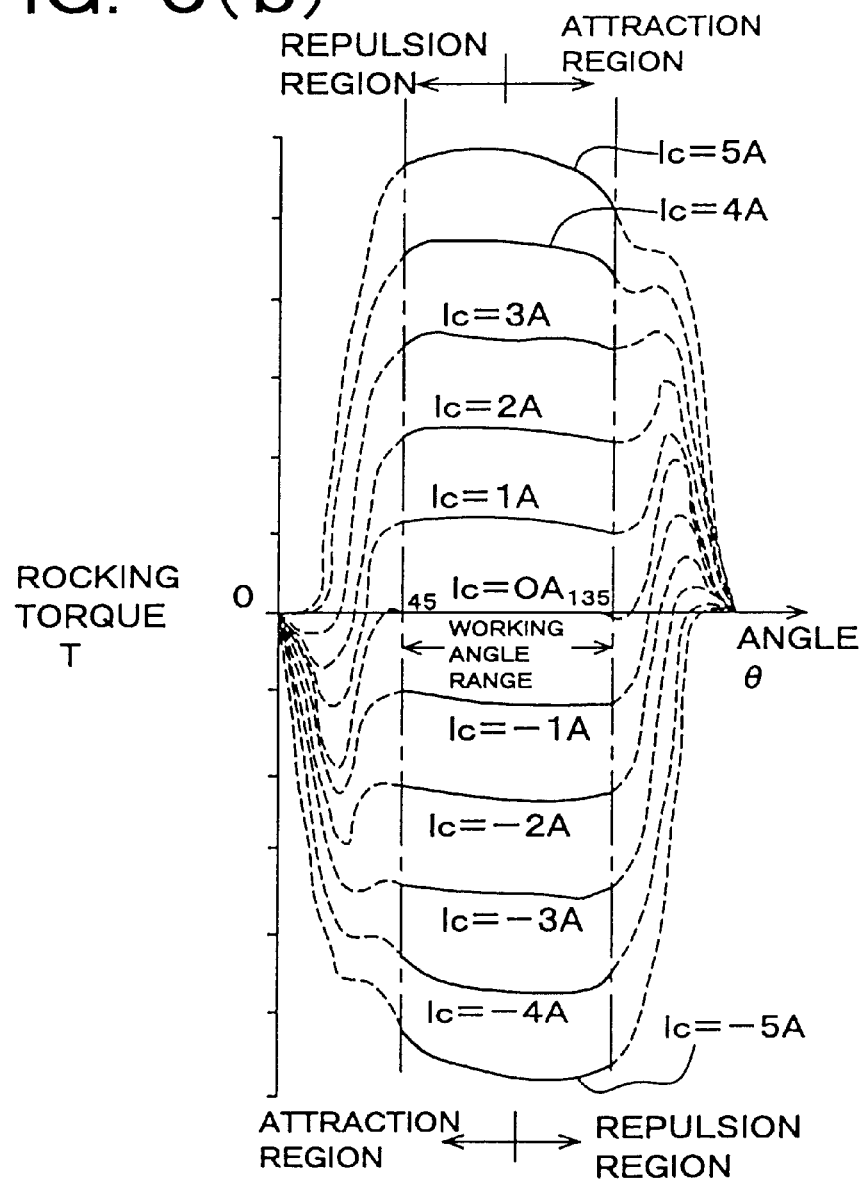
FIG. 6(b) is a graph showing angle-torque characteristics of a DC torque motor according to Comparison Example.
Figure 7:
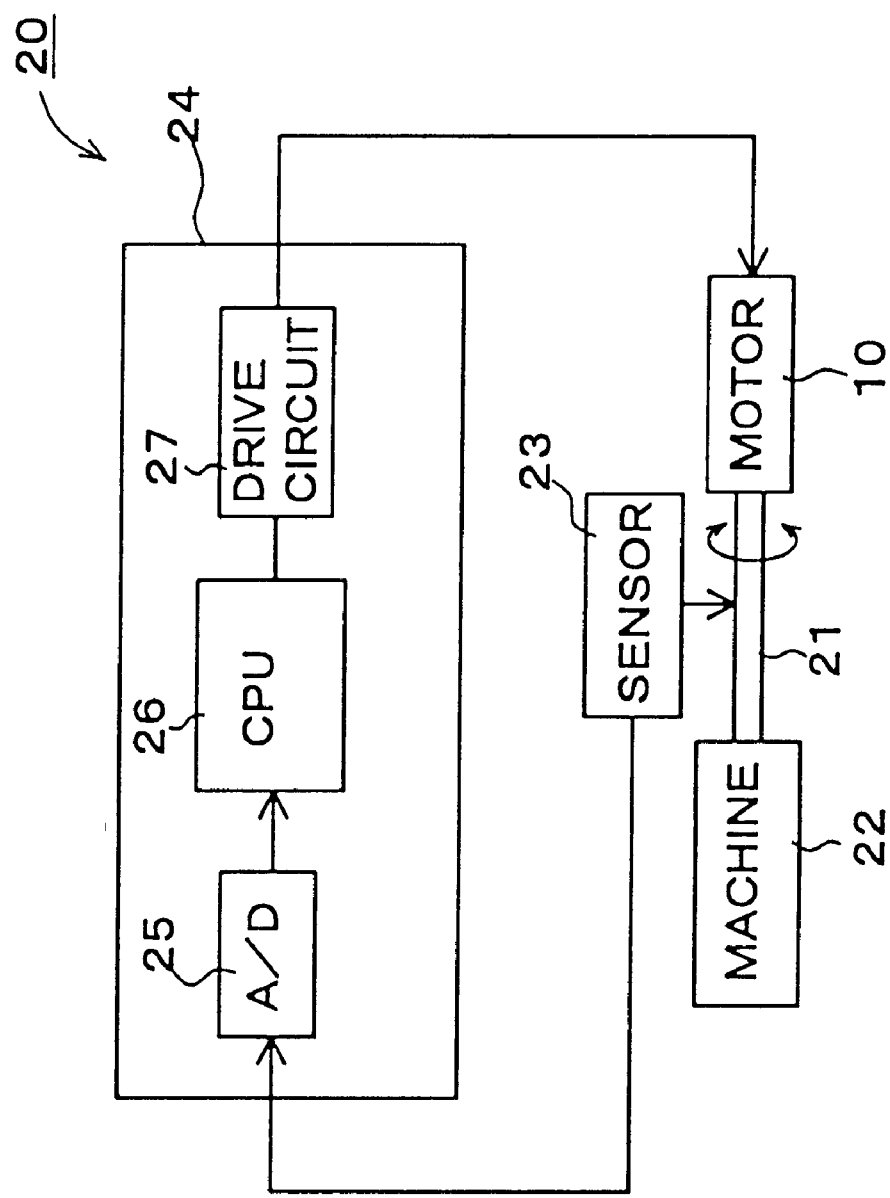
FIG. 7 is a diagram to illustrate a drive control apparatus for driving machine according to the Second Embodiment using a DC torque motor according to the First Embodiment.

Furthermore, FIG. 6(b) shows angle-torque characteristics of the motor 110 measured by the same manner as the First Embodiment. It is apparent from the graphs of FIG. 6(b) that, in the motor 110, rocking torque T is almost constant at any degrees of angle within the working angle range of θ=45 to 135 degrees irrespectively of its positioning at repulsion region or attraction region. Such angle-torque characteristics are considered due to the enlarged section area M2 for the stator 112. That is, the section area M2 is too large to make magnetic flux quantity φ to be saturated in the stator 112 even if magnetic field generated by coil current Ic is applied thereto. Thereby, sufficiently high torque T can be obtained.

The motor 110 having such characteristics is considered to be a correspondent of the above-stated conventional motor. However, since torque obtained by adding coil current Ic is almost constant irrespectively of degree of angle θ, the characteristics simplify control of the motor. However, as easily conceivable from FIG. 5, in the motor 110, the stator 112 made of soft iron is considerably large in dimensions and volume as compared with the motor 10 according to the First Embodiment. Along with this, its weight is considerably heavy, too. As apparent from this, a small-sized, light-weight motor can be realized if making the stator 2 small and light, as described in the First Embodiment.

Second Embodiment

Next, as an embodiment of a motor 10 organized in a machine, the Second Embodiment describes a drive control apparatus 20 employing the motor 10 which is to rock a rocking shaft 21 of a machine (an object to be driven) 22.

In the drive control apparatus 20, the machine 22 and the motor 10 is connected by the rocking shaft 21. Further, rocking angle of the rocking shaft 21 is detected by, for example, an angle sensor 23 consisting of a potentiometer. First, analog output of the angle sensor 23 is converted to digital values by an A/D converter 25 in control unit 24. Then, a computer 26 conducts a predetermined operation in accordance with a control method such as PID control, and calculates drive conditions using the deviation of the angle from an objective angle which is separately input. After that, a motor drive circuit 27 controls value of coil current Ic to be added to the motor 10 following the resultant drive condition and thereby, feedback control of the motor 10 is conducted.

If the rocking shaft 21 is rocked to a large degree by the motor 10, the rocking shaft 21 is rocked with high torque at the beginning of the rocking operation, whereby high angular acceleration can be obtained. For that reason, the response characteristics can be improved. Besides, when the rocking operation is near to end, the energized torque is low and the machine 22 can be, therefore, stopped smoothly. On the other hand, if the rocking shaft 21 is rocked to a less degree, the variation of rocking angle is small and the machine needs not have high response characteristics. Due to this, even if the energized torque is low, stable control can be realized without causing problems. As a result, there is provided a drive control apparatus 20 which has high response characteristics and is simple to control. Furthermore, as stated above, since the stator 2 is small in dimensions and light weight, thereby making it possible to provide a small-sized, light-weight drive control apparatus 20.

Third Embodiment

Next, description will be given to another embodiment for employing the motor 10 in relation to a throttle valve control apparatus 30 for opening and closing a throttle valve by the motor 10. In the throttle valve control apparatus 30 shown in FIG. 8, a butterfly valve type throttle valve 33 is formed at a throttle shaft 31 passing through an inlet tube 32 in the diameter direction. The throttle shaft 31 is rocked by about 90 degrees from a fully closed state to a fully opened state by the DC torque motor 10. Further, the rocking angle θ, that is, the opening of the throttle shaft 31 is designed to be detected by, for example, a throttle opening sensor 34 consisting of a potentiometer. The throttle shaft 31 is urged in valve closing direction (in the lower direction of FIG. 8) by a back spring 36 through a lever 35 which is L-shaped in FIG. 8.

Figure 8:
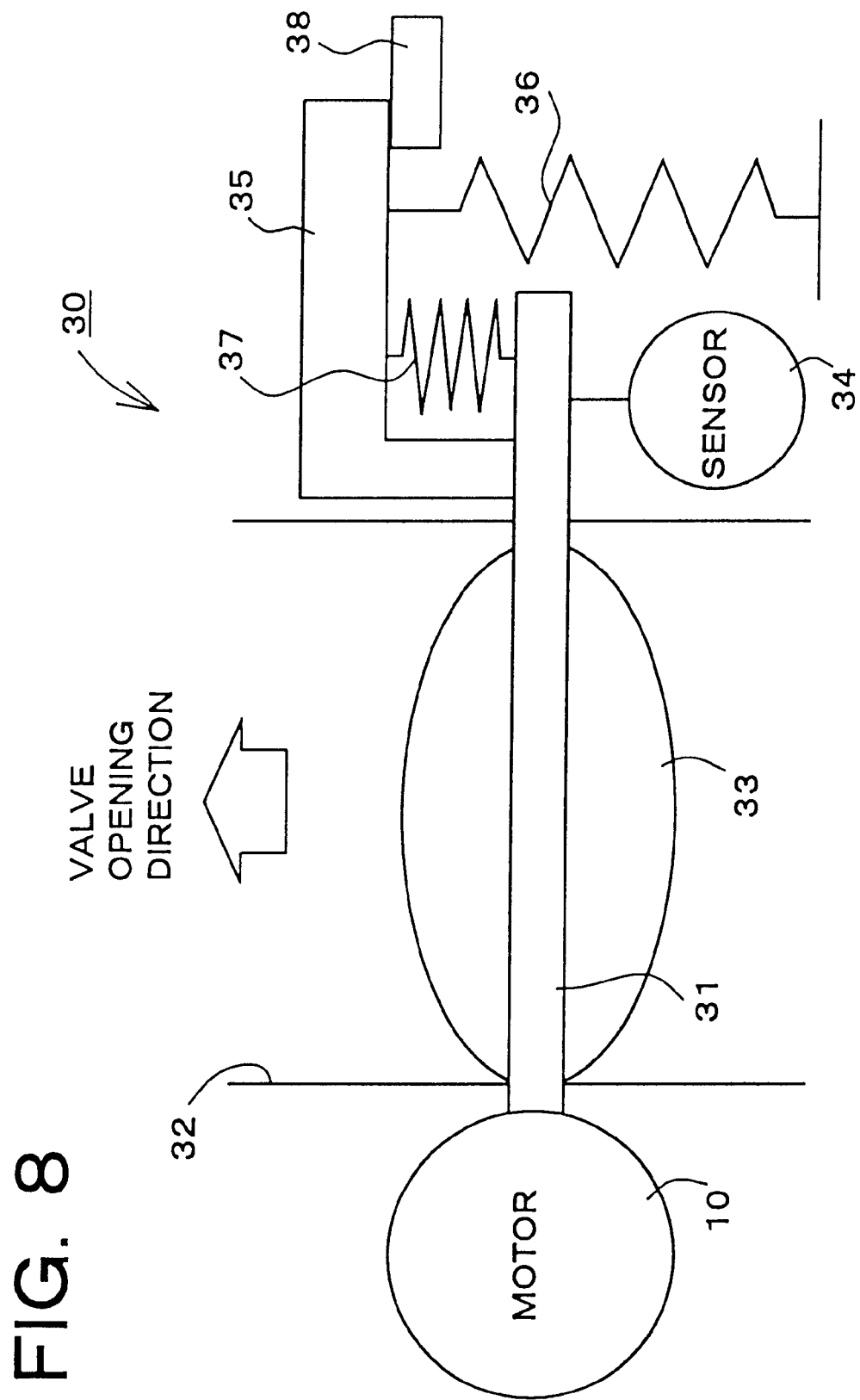
FIG. 8 is a diagram to illustrate a throttle valve control apparatus for opening/closing throttle valve of the Third Embodiment using a DC torque motor according to the First Embodiment.

If the power of the motor 10 is turned off or the motor 10 malfunctions, the throttle shaft 31 is shifted toward the valve closing direction (in the lower direction of FIG. 8). If the shaft 31 approaches a fully closed state, the lever 35 abuts on a full close stopper 38 to prevent the throttle shaft 31 from being urged by the back spring 36. In this state, the throttle shaft 31 is urged toward valve opening direction (in the upper direction of FIG. 8) by a relief spring 37 and the throttle valve 33 is, therefore, held to slightly open compared with a fully closed state.

Since the back spring 36 automatically closes the throttle valve 33 when the power of the motor 10 is turned off or the motor 10 malfunctions, it urges the throttle valve 33 in valve closing direction. The back spring 36 is made of, for example, a helical spring of many turns and set to have a small spring constant. Due to this, the torque (back torque) Tb in valve closing direction energized by the back spring 36 does not greatly increase even if the opening of the throttle valve 33 increases. In other words, the back torque Tb is set to be substantially constant irrespectively of the opening of the valve 33. In addition, the relief spring 37 prevents the throttle valve 33 from being fully closed after being urged by the back spring 36 when the power of the motor 10 is turned off or the motor 10 malfunctions and holds the throttle valve 33 to be slightly opened. That is, the relief spring 37 is designed to urge the throttle shaft 31 in valve opening direction.

In FIG. 8, the throttle valve 33 is opened upward as indicated by an arrow to show the functions of the relief spring 37 and the back spring 36. As can be easily understood, however, the throttle valve 33 and the throttle shaft 31 are actually rocked about the shaft and the back spring 36 and the relief spring 37 urge and twist the throttle shaft 31 about the shaft.

Figure 9:
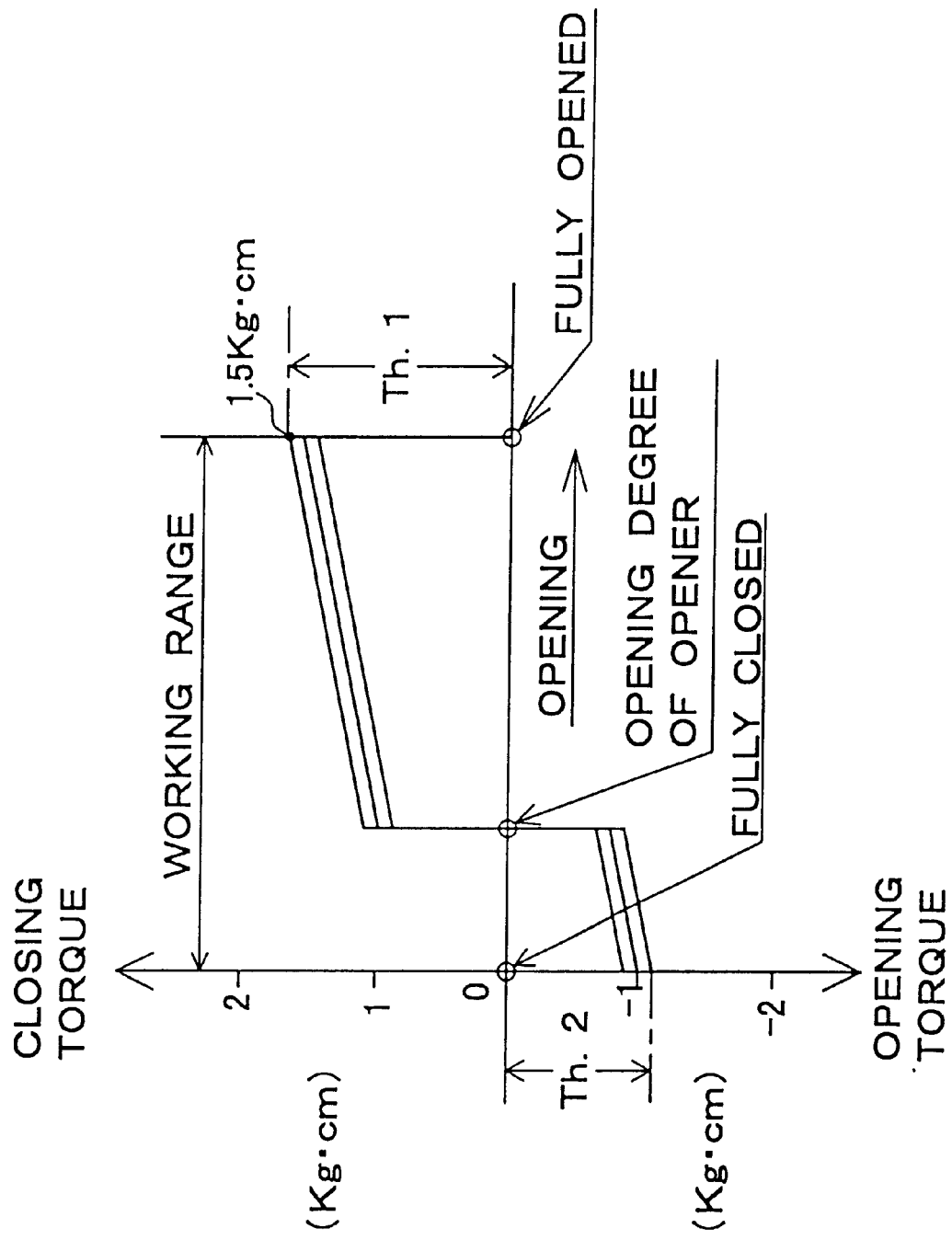
FIG. 9 is a schematic diagram to illustrate opening of throttle valve in view of relationship between back spring 36 and relief spring 37.

FIG. 9 shows a schematic diagram to illustrate opening of throttle valve in view of relationship between the back spring 36 and the relief spring 37. Th1 indicates maximum closing torque including torque by the back spring 36 and dispersion caused by friction. Th2 indicates maximum opening torque including torque by the relief spring 37 and dispersion caused by friction.

The holding torque for the motor 10 is Th1=1.5 Kg·cm at the maximum. If this maximum holding torque is included in a region in which flat torque characteristics can be obtained when constant current is applied to the DC torque motor, control with linear current value can generate torque surpassing holding torque by the back spring 36, whereby linear control of the throttle valve 33 can be realized. As a result, feedback control including control algorithm and the like is made easier.

In this embodiment, the rocking angle θ of the motor 10 simply corresponds to that of the throttle shaft 31. In other words, the throttle shaft 31 is obtained by extending the core 4 (see FIG. 1) of the motor 10 in the axial direction (in a direction perpendicular to the sheet of FIG. 1). In this embodiment, therefore, the motor 10 at the rocking angle θ=45 degrees is made correspondent to the throttle valve 33 in a fully closed state and the motor 10 at the rocking angle θ=135 degrees to the throttle valve 33 in a fully opened state. By doing so, the throttle valve 33 is changed from a fully opened state to a fully closed state by the rocking angle of 90 degrees. Thus, in the graphs shown in FIGS. 3 and 4, the broken lines indicating the angle θ=45 degrees and θ=135 degrees correspond to the fully closed and fully opened throttle valve 33, as indicated by the words in parentheses, respectively.

Accordingly, the positive direction of the rocking angle θ of the motor 10 corresponds to the opening direction (opening side) of the throttle valve 33, whereas the negative direction of the rocking angle θ thereof corresponds to the closing direction (closing side) of the valve 33. Also, the side at which the angle θ is low indicates the throttle valve 33 in the closed state, whereas the side at which the angle θ is high indicates the throttle valve 33 in an opened stated.

Figure 10:
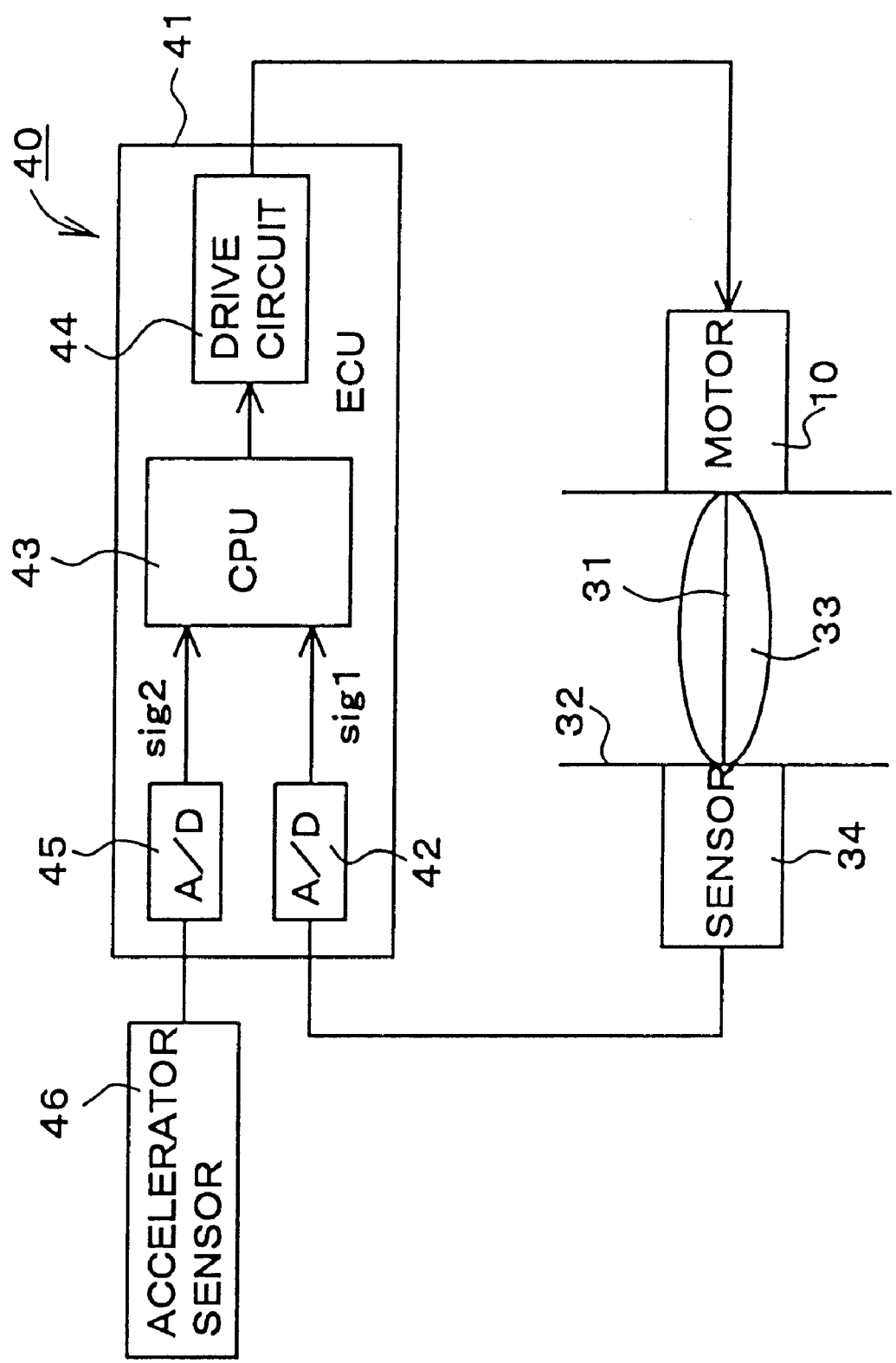
FIG. 10 is a diagram to illustrate control system wherein a throttle valve control apparatus shown in FIG. 8 is controlled by Engine Control Unit.

Next, FIG. 10 shows a state in which the throttle valve control apparatus 30 is connected to and controlled by an engine control unit (to be referred to as 'ECU' hereinafter) 41. The overall apparatus serves as a throttle valve control system 40 corresponding to the drive control apparatus 20 in the second embodiment.

In the throttle valve control apparatus 30 having the above structure, the output of the throttle opening sensor 34 is inputted to the ECU 41. In FIG. 9, the back spring 36 and the like are not shown and the throttle valve control apparatus 30 is shown to be simplified. In the ECU 41, the analog output of the throttle opening sensor 34 is converted to a digitized throttle opening signal Sig1 by an A/D converter 42. In addition, the analog output of an accelerator sensor 46 consisting of a potentiometer for detecting the degree of actuating an accelerator (not shown) operated by a driver is converted to a digitized requested opening signal Sig2 by the second A/D converter 45. Next, using the deviation of the throttle opening signal Sig1 from the requested opening signal Sig2 or the like, a computer 43 conducts a predetermined operation in accordance with a control method, such as PID control, and calculates drive conditions. Using the resultant drive conditions, a motor drive circuit 44 controls the value of the coil current Ic at the motor 10, thereby feedback-control is conducted for the throttle valve control apparatus 30 (or motor 10).

The motor 10 has angle-torque characteristics (see FIG. 2) as stated above. Owing to this, if the shaft 3 or throttle shaft 31 is rocked to a large degree, the throttle shaft 31 and the throttle valve 33 are rocked with high torque at the beginning of the rocking operation, whereby high angular acceleration can be obtained. For that reason, if, for instance, the opening of the throttle valve 33 is changed from around a fully closed state (θ is near 45 degrees) to around a fully opened state (θ is near 135 degrees) or changed from around a fully opened state to a fully closed state, it is possible to improve the response characteristics of the throttle valve 33. Besides, when the rocking operation is near to end, the energized torque is low and the throttle valve 33 can be, therefore, stopped smoothly. On the other hand, if the throttle shaft 31 is rocked to a less degree, the variation of the rocking angle θ is small and the throttle valve 33 needs not have high response characteristics. Due to this, even if the energized torque is low, stable control can be realized without causing any problems. Furthermore, as stated above, since the stator 2 is small in dimensions and light-weight, a small-sized, light-weight motor 10 can be provided, thereby making it possible to provide a small-sized, light-weight throttle valve control apparatus 30. As a result, it is possible to provide a small-sized, light-weight throttle valve control apparatus 30 having good response characteristics and capable of stably controlling a throttle valve.

In the meantime, the throttle valve control apparatus 30 in this embodiment, the throttle shaft 31 is urged toward the valve opening direction by the back spring 36 in a normal operation state as already stated above. Thus, if the throttle valve 33 is to be held to have certain opening, i.e., the rocking angle θ of the motor 10 is to be held to a certain angle θh, a holding coil current Ich needs to be applied to the motor 10 in positive direction to thereby energize holding torque Th in the valve opening direction so as to almost match the back torque Tb caused by urging the shaft 31 by the back spring 36.

It is noted that the back spring 36 is set to have a small spring constant as stated above, so that back torque Tb increases less greatly even if the opening of the throttle valve 33 increases. If the back spring 31 has a large spring constant and the back torque Tb greatly varies (increases) as the opening of the throttle valve 33 increases, high torque and, therefore, high coil current are required to rock the throttle valve 33 to a full opened state against the back torque Tb. In addition, since high holding torque Th which matches the high back torque Tb is developed to hold the valve 33 to the fully opened state, high holding coil current Ich needs to flow. As a result, consumed current (coil current) increases wastefully.

If represented in the graph of FIG. 2 in which angle-torque characteristics are shown, the above-stated back torque Tb is indicated by a solid line. Since the back torque Tb is in the valve opening direction, it is expressed as negative rocking torque. The holding torque Th to be developed by the motor 10 to hold the opening of the throttle valve 33 while matching the back torque Tb, is positive torque symmetric with respect to the back torque Tb about the horizontal axis of the graph as indicated by a dashed line.

If observing angle-torque characteristics in case a coil current Ic=1A, torque is almost constant in the working angle θ range between 45 and 135 degrees irrespectively of the angle, compared with a case where peaks of torque are unevenly seen in the low angle θ range if a coil current Ic is 2A or more. In FIG. 2, the holding torque Th indicated by a dashed line is in a position adjacent to the graph of angle-torque characteristics at coil current Ic=1A. Thus, it is clear that the holding coil current Ich to cause the holding torque Th is almost constant to 1A or less irrespectively of the angle θ. As a result, if the motor 10 is feedback-controlled using the output of the throttle opening sensor 34 to hold the opening of the throttle valve 33 to a certain degree, there is no need to make adjustments, such as to change coefficients for use in the feedback control operation by the computer 43, in accordance with the change of the opening, thereby making feedback control easier.

The above-stated embodiments are examples and do not limit the present invention in any respect. Accordingly, the present invention can be variously improved and changed within the scope not departing from the subject matter thereof.

For example, although the working angle range of a motor 10 according to First Embodiment is set to θ=45 to 135 degrees, the working angle range is not limited to the above-stated setting range. Working angle range of a torque motor may be properly adjusted in accordance with required angle range for the motor. Moreover, although a single-polar type DC torque motor is shown in the Embodiments, a plural-polar type DC torque motor may be used.

Furthermore, although the Third Embodiment describes the throttle valve control apparatus 30 for controlling drive of a throttle valve 33, the present invention may be applied to drive control apparatus for controlling drive of other type of valve, as well as drive control apparatus for controlling other types of machine.

Still further, although a core 4 and a throttle shaft 31 are used as common parts in the throttle valve control apparatus 30 according to the Third Embodiment, these parts may be replaced with different parts so that rocking of the core 4 can be transmitted by a gear, timing belt and the like.

What is claimed is:

1. A throttle valve control apparatus comprising:
   a throttle valve;
   a DC torque motor for driving the throttle valve, the DC torque motor including a stator with a coil wound therearound, and a needle including permanent magnets, the needle being rocked within a predetermined working angle range, wherein a magnetic path is formed within the stator, and a magnetic flux quantity is generated within the stator by the permanent magnets and by the coil when current flows in the coil, wherein the sum of the magnetic flux quantities caused by the permanent magnets and the coil is not saturated while a working angle of the needle is in a repulsion region where the needle repulses the stator and magnetic flux is saturated while the working angle of the needle is in an attraction region where the needle is attracted to the stator;
   throttle opening sensor for outputting information regarding an opening of the throttle valve; and
   a controller which controls the DC torque motor when receiving signals from the throttle opening sensor.

2. A throttle valve control apparatus according to claim 1 further comprising a back spring for urging the throttle valve toward a valve closing direction, wherein a holding-coil-current applied to the DC torque motor is substantially constant in the working angle range irrespective of the degree of angle so as to obtain holding torque for holding the opening of the throttle valve while matching torque developed by the back spring torque.

3. A throttle valve control apparatus according to claim 1, wherein a maximum torque value that the back spring generates within the working angle range is included in a region of the working angle range where approximately flat torque characteristics are obtained when a constant current is applied to the DC torque motor.

4. A throttle valve control apparatus according to claim 1, wherein while it is assumed that a current, an angle and a torque satisfy the following relationship that: if the current in a positive direction is applied, the direction of said angle at which the DC torque motor is rocked is positive and the direction of torque developed at this moment is positive: and if current in negative direction is applied, the direction of angle at which the DC torque motor is rocked is negative and the direction of torque developed at this moment is negative, the motor has angle-torque characteristics position of torque peaks among the torque in a positive direction developed by the constant current in the positive direction spread in a low angle region among the working angle range; and positions of torque peaks among the torque in a negative direction developed by the constant current in the negative direction spread in a high angle region among the working angle range.

5. A throttle valve control apparatus according to claim 1, wherein the DC torque motor comprises:
   a stator having a generally U-shape and having arms with end portions facing each other and having magnetic pole sections arranged thereon;
   a needle surrounded by the end portions of the stator, being rotatably supported;
   wherein a portion of the arms of the stator has a section area A smaller than that of the magnetic pole sections, the stator is formed of a material having a saturation magnetic flux density B, and the section area A satisfies the condition that the product of A and B is smaller than the sum of (i) a magnetic flux quantity which occurs when an electric current flows in the coil and (ii) a maximum permanent magnetic flux quantity generated by the permanent magnets within the working angle range.

6. A throttle valve control apparatus according to claim 5, wherein the stator of the DC torque motor is composed of magnetic steel sheets superimposed, whose saturation magnetic flux density is larger than 1.6 T (tesla).

* * * * *

UNITED STATES PATENT AND TRADEMARK OFFICE
CERTIFICATE OF CORRECTION

PATENT NO. : 6,320,285 B1
DATED : November 20, 2001
INVENTOR(S) : Yoshiki Ito et al.

It is certified that error appears in the above-identified patent and that said Letters Patent is hereby corrected as shown below:

<u>Title page,</u>
ABSTRACT, line 15, "dc" should read -- DC --.

<u>Column 15, claim 1,</u>
Line 57, before "throttle opening" insert -- a --.

<u>Column 16, claim 2,</u>
Line 23, "positive:" should read -- positive; --.

Signed and Sealed this

Second Day of April, 2002

Attest:

*Attesting Officer*

JAMES E. ROGAN
*Director of the United States Patent and Trademark Office*